Feb. 17, 1948.   C. F. AMERING   2,436,085
VACUUM ENVELOPE FOR PHOTOGRAPHIC PRINTING
Filed Jan. 29, 1947

CHARLES F. AMERING
INVENTOR
BY
ATTORNEYS

UNITED STATES PATENT OFFICE 2,436,085

VACUUM ENVELOPE FOR PHOTOGRAPHIC PRINTING

Charles F. Amering, Rochester, N. Y., assignor to Eastman Kodak Company, Rochester, N. Y., a corporation of New Jersey Application January 29, 1947, Serial No. 725,061

7 Claims. (Cl. 95—76)

The present invention relates to photography, and more particularly to a copy holder for use in photographing printing.

In both contact and projection printing, it is sometimes desirable to photograph pages of a book, or a document which has been rolled. In order to secure the desired photographic reproduction, it is necessary that the subject or copy be held flat and substantially in a plane during the exposure period. Also in contact printing where the negative or positive sensitized material is placed in engagement with the subject being photographed, it is imperative, for good results, to insure good and intimate contact between the object and the sensitized material throughout the area being photographed, as is well known to those in the art. Such contact is also important in cases where the sensitized material is in engagement with an irregular shaped or curved object which is to be reproduced photographically. In such cases, it is necessary to insure that the sensitized material will be held positively in physical contact over the desired area of the subject or copy.

In order to secure these results, the present invention provides a vacuum envelope in which the copy or the copy and sensitized material are placed. In the case of projection printing, only the copy is placed in the envelope and the latter is then evacuated to hold and maintain the copy in a flat planar position. In contact printing, however, both the copy and the negative or positive sensitized material are placed in the envelope which, upon being evacuated, positively holds the sensitized material in physical and intimate contact with the object or copy to be photographed. Such an arrangement is highly desirable in reflex printing processes and other photographic printing processes which are familiar to those in the art and need no further description.

The invention has as its principal object the provision of a vacuum envelope for use in photographic printing.

A further object of the invention is the provision of a novel means for effectively evacuating the envelope.

A still further object of the invention is the provision of a single means both for sealing and evacuating the envelope.

Yet another object of the invention is the provision of a sealing and evacuating means which is simple, of few parts of rugged construction, inexpensive, easy to use, and highly effective in its results.

To these and other ends, the invention resides in certain improvements and combinations of parts, all as will be hereinafter more fully described, the novel features being pointed out in the claims at the end of the specification.

The drawings show a vacuum envelope formed of a sheet material to provide opposite sides 11 and 12 which are sealed along the three edges 13, 14, and 15. One side 16 is left unsealed to provide an opening through which material may be placed in and removed from the envelope. This envelope may be formed of any suitable material; but at least one side, or the portion of the side through which the printing light passes, is made of a flexible light-transmitting material. However, in the preferred embodiment both sides 11 and 12 are formed of a suitable flexible transparent or light-transmitting resin sheeting or similar material.

Figure 2:
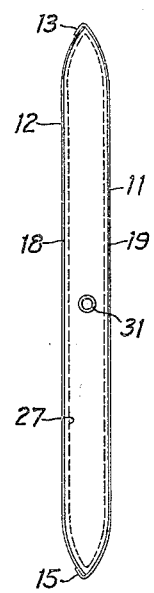
Fig. 2 is an end view of the structure illustrated in Fig. 1.

After the copy or subject and other materials are placed in position in the envelope, a rigid sealing strip of plastic or wood, generally indicated by the numeral 17, is inserted in the open end 16 of the envelope. This strip is formed with substantially parallel sides 18 and 19 and tapered ends 20 which connect the sides as best shown in Figs. 2 and 4. This strip is inserted into the envelope so that the areas 21 of the sides 11 and 12 overlie the sealing portions 22 of the sides 18 and 19. The other end or edge 23 of the strip may be flush with or positioned slightly inside the free edges 24 of the sides 11 and 12, all as shown in Fig. 3.

Figure 3:
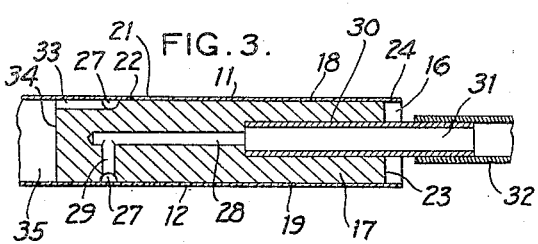
Fig. 3 is a longitudinal sectional view taken substantially on line 3—3 of Fig. 1, showing the relation of the sealing and evacuating device to the envelope.
Figure 4:
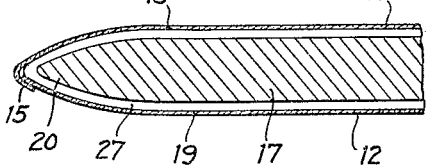
Fig. 4 is a partial transverse sectional view taken substantially on line 4—4 of Fig. 1, showing the evacuating channel of the sealing strip.

The sides 18 and 19 and the tapered ends 20 are provided with a continuous annular evacuated channel 27 which is spaced from the end 23, see Fig. 3. An inlet opening 28 is drilled into the sealing strip from the edge 23 and is connected by a lateral conduit 29 with the channel 27 so that the latter and the opening 28 are in fluid communication, as will be apparent from an inspection of Fig. 3. The outer end 30 of the opening 28 is enlarged or countersunk to receive a pipe 31 which may be connected by a rubber or flexible tubing 32 to a suitable evacuating or vacuum means, not shown. An open slot or cut-out 33 is formed on the side 18 and extends inwardly from the channel 27 to the left side 34 of the strip, as viewed in Fig. 3, to connect the channel 27 in fluid communication with the interior 35 of the envelope. Thus, the channel 27 extends all the way around the sealing strip and is connected by the normally arranged slots 33 and the inlet opening 28 to the interior 35 of the envelope and the outer air or the evacuating device so that when a vacuum or suction is applied to the pipe 31, the interior 35 of the envelope may be evacuated to collapse the walls 11 and 12.

In order that the envelope with the material positioned therein may be effectively and readily evacuated, it is necessary that the envelope be first sealed. To accomplish this result, the inlet 28 and conduit 29 are connected to the channel 27 on the side 19, while the slot 33 is positioned on the side 18 and opposite to the conduit 29. Thus, the inlet and outlet of the evacuating channel 27 are positioned, in effect, at opposite ends of the channel to prevent short-circuiting between the inlet and outlet. As a result of this spaced relation, when suction is applied to the inlet 28, the channel 27 is first evacuated and causes the areas 21 of the sides 11 and 12 to be collapsed or drawn-down into tight sealing relation with the sealing portions 22 of the sides 18 and 19 and ends 20, thus first sealing the open end 16 of the envelope. Further evacuation of inlet 28 serves to evacuate slot 33 and finally the interior 35 of the envelope to collapse the latter. Thus, the sealing strip provides an arrangement by which the open end of the envelope is first sealed, and then the envelope is evacuated to collapse the sides 11 and 12 down into tight engagement with the copy to retain the latter in a plane. If, however, a positive or negative sensitized material is also positioned in the envelope, the collapsing of the latter serves to bring the material and hold it in tight engagement with the copy to afford the necessary contact therewith.

With such an arrangement, irregular shaped objects may be positioned in the envelope with the assurance that the sensitized material will be positioned to provide the necessary contact for good contact printing, the advantages of which will be readily apparent to those in the art.

Figure 5:
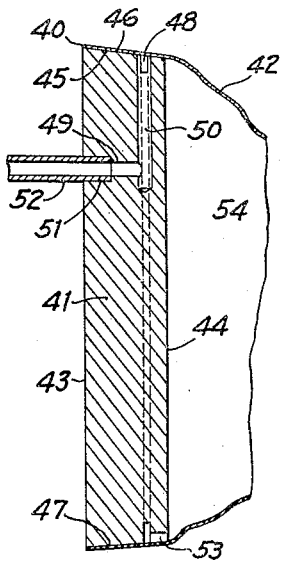
Fig. 5 is a transverse sectional view through a modified form of sealing and evacuating strip.
Figure 6:
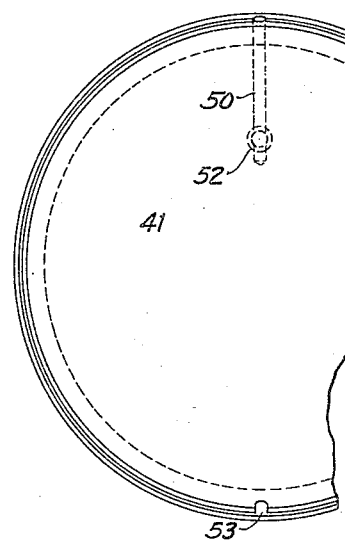
Fig. 6 is a plan view of the structure illustrated in Fig. 1.

While the envelope above described is shown as rectangular, the same principle may be applied to cylindrical, conical, or other odd-shaped envelopes. In such cases, the sealing strip obviously must conform in shape to the open end of the envelope. Figs. 5 and 6 show a sealing strip as applied to a cylindrical-shaped envelope, or at least to an envelope having a circular open end 40. In this embodiment, the envelope may be made of the same material as the envelope above described and illustrated in Figs. 1 to 3. In this modified arrangement, the sealing strip, generally indicated by the numeral 41 is circular in shape so as to fit snugly in the circular open end 40 of the envelope 42 and is formed with parallel sides 43 and 44 and a tapered periphery 45, as best shown in Fig. 5. With this arrangement, the areas 46 of the envelope adjacent the open end fit over the sealing portion 47 of the tapered periphery 45. The latter is provided with a continuous annular evacuating channel 48 positioned intermediate the portion 47 and the inner side 44, as best shown in Fig. 5. An inlet opening 49 is drilled down from the upper side 43, and is connected by a radial conduit 50 to the channel 48 to bring the latter into fluid communication with a point outside the envelope. The opening 49 is countersunk at 51 to receive a pipe 52 which is adapted to be connected to a suitable evacuating apparatus, not shown. Thus, the channel 48 may be operatively connected to an evacuating apparatus of any suitable type. The channel 48 is, in turn, connected by a slot 53 formed in the periphery 45 to connect the channel in fluid communication with the interior 54 of the envelope.

Figure 1:
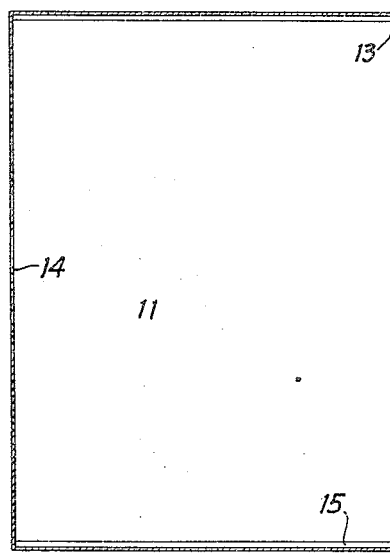
Fig. 1 is a plan view of a vacuum envelope, showing the relation thereto of a sealing and evacuating device constructed in accordance with the present invention.

Like the construction shown in Figs. 1 and 2, the application of a vacuum or suction to the pipe 52 first evacuates the channel 48 to cause the areas 46 of the envelope to collapse or to be pulled down tightly into sealing relation with the portion 47 on the periphery 45, as is apparent. Thereafter, the interior 45 of the envelope is evacuated by means of the slot 53 to cause the sides or walls of the envelope to collapse, for the reasons described above. Thus, the envelope is first effectively sealed and then evacuated and collapsed. In order to insure that the envelope will be sealed first, the slot 53 is diametrically positioned from the inlet 49, as clearly shown in Fig. 5, so that, in effect, it is at the opposite ends of the channel 48, to prevent short circuiting between the inlet and outlet.

The present invention thus provides a simple, rugged, easily-operated, and effective arrangement by which a flexible envelope suitable for photographing printing may be sealed and then collapsed to hold the parts in proper position for printing. While the envelope has been described for use in photographic printing, this is by way of illustration only as it is contemplated that such an arrangement is adapted for any use wherein a sealed, collapsed envelope is desirable or necessary. This application is, therefore, not to be limited to the precise details disclosed, but is intended to cover all variations and modifications thereof falling within the scope of the appended claims.

I claim:

1. A photographic printing device comprising, in combination, a copy holding envelope provided with an open end and having at least a portion of one side thereof formed of a flexible light-transmitting material, of a rigid sealing strip adapted to fit snugly into said open end, and means on said strip for sealing and exhausting said envelope including a peripheral channel found on said strip and arranged in fluid communication with the interior and exterior of said envelope whereby said channel may be exhausted to evacuate said envelope.

2. A photographic printing device comprising, in combination, a copy holding envelope provided with an open end and having at least a portion of one side thereof formed of a flexible light-transmitting material, of a rigid sealing strip adapted to fit snugly into said open end, said strip having a circumferential evacuating channel extending around said strip, an evacuating connection formed in said strip and communicating with said channel and extending exteriorly of said envelope and adapted to be evacuated, and an exhausting opening in said strip connecting said channel to the interior of said envelope to exhaust the latter when said connection is evacuated.

3. A photographic printing device comprising, in combination, a copy holding envelope provided with an open end and having at least a portion of one side thereof formed of a flexible light-transmitting material, of a rigid sealing strip adapted to fit snugly into said open end, said strip being formed with a circumferential evacuating channel spaced from said open end, an evacuating connection formed in said strip and communicating with said channel and extending exteriorly of said envelope, a sealing portion formed on said strip intermediate said channel and said end of said envelope and positioned within said envelope adjacent said end, said connection being adapted to be evacuated to exhaust said channel to cause the section of said envelope between said channel and said end to grip said portion to seal said end, and an exhausting opening formed in said strip to connect said channel with the interior of said envelope to exhaust the latter subsequent to the sealing thereof.

4. A photographic printing device comprising, in combination, a copy holding envelope provided with an open end and having at least a portion of one side thereof formed of a flexible light-transmitting material, of a rigid sealing strip adapted to fit snugly into said open end, said strip having a circumferential evacuating channel extending around said strip, an evacuating connection formed in said strip and communicating with said channel and extending exteriorly of said envelope and adapted to be evacuated, and an exhausting opening in said strip connecting said channel to the interior of said envelope to exhaust the latter when said connection is evacuated, said connection and said opening being positioned substantially at opposite ends of said channel.

5. A photographic printing device comprising, in combination, a copy holder envelope provided with an open end and having at least a portion of one side thereof formed of a flexible light-transmitting material, of a rigid sealing strip adapted to fit snugly into said open end, said strip having a continuous circumferential evacuating channel formed therein and spaced from the open end of said envelope, an evacuating connection formed in said strip and extending normal to said channel to connect the latter to a point outside said envelope, and an exhausting slot in said strip connecting said channel in fluid communication with the interior of said envelope to exhaust the latter when said channel and connection are evacuated.

6. A photographic printing device comprising, in combination, a copy holding envelope provided with an open end and having at least a portion of one side thereof formed of a flexible light-transmitting material, of a rigid sealing strip adapted to fit snugly into said open end, said strip having a continuous circumferential evacuating channel formed therein and spaced from the open end of said envelope, an evacuating connection formed in said strip and extending normal to said channel to connect the latter to a point outside said envelope, a sealing portion formed on said strip intermediate said channel and said end and positioned within said envelope adjacent said end so that when said channel is evacuated by exhausting said connection the envelope will be drawn into sealing relation with said portion, and an exhausting slot formed on said strip and connecting said channel in fluid communication with the interior of said envelope to exhaust the latter when said channel is evacuated.

7. A photographic printing device comprising, in combination, a copy holding envelope provided with an open end and having at least one side thereof formed of a flexible light-transmitting material, of a rigid tapered sealing strip adapted to fit snugly into said open end and to engage the sides of said envelope, said strip being formed with a peripheral channel spaced from said end, a sealing portion formed on said strip intermediate said channel and said end and positioned within said envelope, and means on said strip for connecting said channel in fluid communication with the interior of said envelope and a point exterior thereof so that when said channel is evacuated said envelope will be drawn into sealing relation with said portion and the interior of said envelope will be evacuated.

CHARLES F. AMERING.